United States Patent Office 3,573,034
Patented Mar. 30, 1971

3,573,034
STRESS-CORROSION RESISTANT STAINLESS STEEL
Elbert E. Denhard, Jr., Towson, Md., assignor to Armco Steel Corporation, Middletown, Ohio
Filed Sept. 18, 1967, Ser. No. 673,242
Int. Cl. C22c 39/20
U.S. Cl. 75—128                              9 Claims

ABSTRACT OF THE DISCLOSURE

Austenitic chromium-nickel stainless steel of high carbon content, and various products fashioned thereof, which steel and products are strong, ductile and wear-resistant and which moreover are resistant to the attack of chlorides in applications where great stress is encountered. More particularly, the steel comprises about 18% to about 25% chromium, about 9% to about 20% nickel, about .25% to about .85% carbon, with carbon being inversely proportioned to nickel, and with remainder substantially iron.

INTRODUCTION

My invention relates to the stainless steels, more particularly to the austenitic stainless steels suited to a variety of applications where corrosive attack is encountered under stress.

One of the objects of my invention is the provision of a fully austenitic stainless steel which readily lends itself to a variety of hot-working and cold-working operations, which may be fabricated by way of common welding techniques, and which is possessed of a combination of good general corrosion-resistance, good resistance to intergranular corrosion, and good resistance to corrosion under stresses commonly encountered in use.

Another object is the provision of forgings, hot-rolled or drawn products, such as bar, rod and wire, as well as plate, sheet and strip, and cold-rolled or drawn products, particularly cold-drawn wire and cold-rolled plate, sheet and strip, all of which forged hot-worked or cold-worked products readily lend themselves to fabrication by well-known techniques of bending, pressing, drawing, cutting, and the like, and brazing or welding, as in the production of a host of articles of ultimate use, which steel and articles are possessed of strength, ductility, general corrosion-resistance and resistance to corrosive attack under stress.

A further object is the provision of a variety of products which are strong and durable under conditions of stress in the presence of corrosive media, i.e., piping, tubing, fluid valves, fittings, and the like for a wide variety of applications.

Other objects of my invention in part will be obvious and in part more particularly pointed to in the description which follows.

Accordingly, the invention may be considered to reside in the combination of the ingredients and in the relation between each of the same with one or more of the others, as well as in the semi-converted and converted products thereof, and articles of ultimate use fashioned of the same as described herein, the scope of which invention is defined by the claims at the end of this specification.

BACKGROUND OF THE INVENTION

In order to better understand certain features of my invention, it may be well to note at this point that the austenitic alloys commonly available for applicaions encountering great stress in the presence of strongly corrosive, or even mildly corrosive, atmospheres usually contemplate the presence of large quantities of nickel. As a result they are very costly, costly to produce and costly to fabricate. One such alloy is "Inconel 600" (about 16% chromium, about 76% nickel, and about 8% iron). This alloy, while possessed of good resistance to most corrosive media and enjoying excellent resistance to corrosion-cracking under stress, is somewhat lacking in strength. Moreover, it welds with difficulty, is susceptible to intercrystalline corrosion in use, and its resistance to wear and abrasion leaves much to be desired. The cost is high because of the great amount of nickel required.

Another available alloy is "Armco 20-45-5" (about 20% chromium, about 45% nickel, about 5% manganese, about 3% molybdenum, and remainder iron). This alloy, like "Inconel 600," is well suited to applications where there are encountered substantial stresses in the presence of a corrosive atmosphere, but its resistance to wear and abrasion is a bit short of that desired. And because of the rather high nickel requirement, it is costly.

A further available alloy is "Inconel 800" (about 21% chromium, about 33% nickel, with remainder iron). While less costly than "Inconel 600" and "Armco 20-45-5", it welds with difficulty, and its resistance to wear and abrasion also is lacking. Furthermore, it is not immune to stress-corrosion cracking.

Now of the chromium-nickel stainless steels, the 18-18-2 grade of chromium-nickel-silicon steel, while of about the same strength as "Inconel 600," "Armco 20-45-5" and "Inconel 800," is lacking in resistance to corrosive attack under stress. And its strength at high temperatures is rather limited. Because of the lower nickel requirement, this steel is significantly less expensive than the other three alloys. But like those other alloys, the resistance to wear and abrasion is insufficient for many applications.

In general, it may be said that the known nickel-base alloys and the known chromium-nickel stainless steels are not suited to many applications where a fabricated welded structure is contemplated, or where there is encountered wear and abrasion in use, or where, in addition to corrosion under stress, there additionally may be encountered general corrosive attack, i.e., oxidation.

SUMMARY OF THE INVENTION

It is one of the objects of my invention, therefore, to provide a chromium-nickel stainless steel which is significantly leaner than the known and available nickel-base alloys and the known highly alloyed stainless steels, which chromium-nickel stainless steel not only is less expensive in the melting, in the working, and in fabrication, but which readily lends itself to welding, and which is resistant to wear and abrasion, is suited to high temperature applications and which, moreover, possesses a combination of excellent resistance to corrosion under stress along with fair resistance to intergranular corrosion.

I find that in the austenitic chromium-nickel stainless steels great resistance to stress-corrosion cracking, that is, cracking under the conditions of stress in the presence of a corrosive atmosphere, commonly requires the presence of great quantities of nickel, for in most applications it is the chloride ion that is involved. Illustratively, in the operation of boilers, evaporators, heat exchangers, and similar apparatus and equipment, the fluids being handled evaporate and build up a concentration of one chloride or another, i.e., sodium chloride, calcium chloride or magnesium chloride. One region of common attack is somewhat above the usual liquid level, a region of splash and evaporation.

And there is another factor, that is, the condition of the metal surface itself. It not infrequently happens that highly localized stress is developed from certain of the fabricating operations commonly resorted to, such as pressing, grinding, bending and shearing. These provide focal points for the initiation of stress-corrosion cracks. And even in the pickling and descaling operations commonly resorted to, minute cracks or notches may develop, which also serve as a basis for stress-corrosion cracking.

While the chromium-nickel alloys employing great quantities of nickel commonly are used for applications encountering stress under corrosive conditions, for example, tanks, vats, piping, tubing, fluid valves, fittings, and the like, I find that a best combination of strength and resistance to corrosive attack under stress for such applications, all at minimum cost, is had in the chromium-nickel stainless steel of high carbon content according to my invention. For I find that by greatly increasing the carbon content of the steel, the nickel content may be minimized. Where desired, manganese commonly is present in my chromium-nickel stainless steel in usual amounts. And silicon, a further ingredient commonly present, may be employed in usual amounts. In fact, in many applications, silicon may partially replace some of the nickel present in the steel. Molybdenum, too, may be incorporated in the alloy should it be desired to improve its resistance to pitting corrosion. It is undesirable, however, that vanadium, titanium, or columbium be purposely employed, for I find that these ingredients rob the steel of carbon and proportionately decrease the effective amount of carbon present. Phosphorus and sulfur, further ingredients commonly present in chromium-nickel stainless steels, are limited to the usual low amounts.

DESCRIPTION OF THE PREFERRED EMBODIMENTS

In the steel of my invention the chromium content ranges from about 18% to about 25%, the nickel content from about 9% to about 20%, and the carbon content from about .25% to about .85%, and with the carbon content within its ranges being inversely proportioned to the nickel content. The remainder is substantially iron. In this steel, manganese may be present in amounts up to about 2%, and silicon present in amounts up to about 4%. The phosphorus and sulfur commonly are present in amounts not exceeding about .04% for the phosphorus and not exceeding about .03% for the sulfur. For specific purposes, molybdenum may be present in amounts up to about 4%, in which event nickel is proportionately increased.

A best combination of results is had where a particular relationship is preserved between the nickel content and the carbon content of any particular steel, this depending upon the chromium level. In general, for any chromium level, the amount of carbon employed is in an inverse relation to the amount of nickel employed.

In the steel of my invention the chromium, the nickel, and the carbon contents are in every sense critical. For I find that where the permissible limits of any one of these ingredients are significantly departed from, one or more of the desired combination of properties is lost, or greatly sacrificed. Thus, for the chromium content I find that the resistance to general corrosive attack suffers with a decrease in the chromium content below the lower permissible figure of about 18%. And, too, with the decrease in chromium, the stabilizing effect of chromium on the austenitic structure of the metal is sacrificed. Conversely, I find that with an increase in the chromium content above the figure of about 25%, the workability of the metal directly suffers, and so, too, its formability. Moreover, an increased chromium content requires re-balancing of the alloy to maintain its austenitic structure, this at additional cost. The chromium content, then, ranges from about 18% to about 25%, more especially about 21% to about 25% or about 22% to about 24%.

Similarly, the nickel content of my steel is in the amount of about 9% to about 20%, although under some circumstances it is best maintained in the amount of about 10% to about 16%, and more especially in the amount of about 14% to about 16%. With a nickel content of less than about 9%, it is difficult to maintain the desired resistance to stress-corrosion cracking unless a disproportionately great amount of carbon is added, this causing difficulties, particularly intercrystalline corrosion after welding or other heating at high temperatures, and a loss of general corrosion-resistance as well. Moreover, it is difficult to maintain the desired austenitic structure of the steel without the prohibitively great amount of carbon. And with a nickel content exceeding about 20%, the cost of the metal proportionately increases, and this without significant benefit. Moreover, the increased nickel content lowers the solubility to carbon, and the metal is inclined to become susceptible to intercrystalline corrosion. Also, I find that with a significant increase in nickel certain welding difficulties are encountered, that is, the weld metal is less fluid and more difficult to handle.

The carbon content, too, is critical, this ranging from .25% to .85%. With carbon in amounts less than .25%, unless excessive nickel is employed, all at increased expense and with difficulties pointed to above, the metal is inclined to cracking under stress-corrosion conditions. As well, the fluidity of the metal is lost and weldability directly suffers. And, too, there is a loss of strength. Carbon in an amount exceeding about .85% as generally noted above, results in an increased loss of general corrosion-resistance. Moreover, with carbon exceeding .85%, workability suffers. In fact, the metal becomes hot-short and no longer is suited to the production of wrought forms. For the production of forgings, and particularly hot-rolled bars, rods, plate, sheet, and the like, a carbon content not exceeding about .75%, preferably not exceeding about .70%, is desired. For the production of castings, however, the carbon content well may amount to about .85%.

For a best combination of strength, ductility, resistance to wear, weldability, resistance to stress-corrosion cracking, resistance to intercrystalline corrosion, and good general resistance to corrosion, as well as good workability in the hot-mill, the cold-mill and in various fabricating operations, I employ a chromium content of about 21% to about 25%, a nickel content of about 10% to about 16%, and a carbon content of about .30% to about .50%, with, of course, the remainder substantially iron. The manganese content, although not critically important, is maintained in amounts up to about 2%, as previously indicated. With greater amounts of manganese there is an inclination to pick up excessive nitrogen contents in melting, an ingredient which in my view detracts from the stress-corrosion resistance of the metal, and moreover, causes hot-working difficulties in view of the high carbon content. The ingredient silicon, however, appears to be beneficial and may be employed, as noted above, in amounts up to about 4%. A silicon content in excess of this figure is not desired, for it seems to cause hot-working difficulties.

My steel of critical composition balance is well suited to applications in the nuclear, petro-chemical and food industries. It is especially suited to use in steam generators in the nuclear field, as in the form of piping, tubing and valve parts. It likewise is suited to similar applications in the chemical industry, and, in addition, it is suited to the production of heat exchangers, tanks, vats, and the like. In the food industry it is suited to the production of cooking vessels, jacketed kettles, and similar equipment, where there is encountered a combination of attack by chlorides and the like under conditions of stress.

While the reasons for the surprising success of my steel are not fully known, I am inclined to the view that in the chromium-nickel austenitic steel of high carbon content according to my invention there are formed chromium carbides which appear in the metal as a galaxy of minute discrete particles. The regions surrounding these particles may serve as cathode areas which effectively prevent the electro-chemical corrosion thought to occur in the presence of chlorides. Or, it very well may be that carbon, a known interstitial element, serves to promote a tangled array of dislocations in the crystal structure, this contributing strength as distinguished from the usual planar array. In any event, and regardless of theoretical considerations, I find that the steel of my invention possesses a combination of strength and resistance to corrosion under stress which is both new and surprising.

A preferred steel in accordance with the practice of my invention essentially consists of about 18% chromium, about 9% nickel, about .60% to about .85% carbon, and remainder substantially iron. Another essentially consists of about 18% chromium, about 12% nickel, about .30% to about .80% carbon, more preferably about .30% to about .50% carbon, and remainder substantially iron. A still further steel essentially consists of about 18% chromium, about 20% nickel, and about .25% to about .50% carbon, with remainder substantially iron. In these steels there is had a combination of strength, ductility and resistance to stress-corrosion cracking. Moreover, they are suited to various hot-working, cold-working and cold-forming operations. Additionally, they are readily welded and possess a useful level of intercrystalline corrosion in use.

A further group of preferred steels essentially consists of about 23% chromium, about 12% nickel, about .50% to about .75% carbon, and remainder substantially iron; or about 23% chromium, about 15% nickel, about .30% to about .65% carbon, and remainder substantially iron; or even about 23% chromium, about 20% nickel, about .25% to about .60% carbon, and remainder substantially iron. These steels possess a combination of superior strength along with resistance to corrosion under stress. And they readily may be worked and formed by conventional methods into a host of articles of ultimate use. Perhaps a most preferred steel according to my invention essentially consists of about 23% chromium, about 15% nickel, about .30% to about .50% carbon, with remainder substantially iron. In this steel, as noted aabove, manganese may be present in amounts up to about 2% and silicon present in amounts up to about 4%. More broadly stated, this steel essentially consists of about 22% to about 24% chromium, about 14% to about 16% nickel, about .30% to about .40%, or even to about .50% carbon, with remainder essentially iron.

The steel of my invention conventionally is made in the electric arc furnace. Where desired, of course, it may be melted in the induction furnace, or it may be vacuum melted as by melting in the electric arc furnace under vacuum conditions. Still further, it may be melted by way of a double melting process, that is, melted in the electric arc furnace or in the induction furnace and the resultant steel cast in the form of electrodes which are then remelted under vacuum conditions.

However melted, the metal is cast in the form of ingots which are then converted into slabs, blooms and billets. In due course these forms are reheated and the metal is converted into plate, sheet, strip, tubes, bars, rod and wire in the hot-mill. Where desired, these products are further converted into cold-rolled sheet and strip or cold-drawn wire, from which they are fashioned into a host of products, equipment and apparatus for use in the nuclear, petroleum, chemical, food, and other industries.

It will be understood that the metal may be converted into forging stock and fashioned into a variety of articles of ultimate use. Or that the metal may be remelted and cast into a variety of specific articles.

In the many varied applications of my steel the metal lends itself to ready fabrication, as by cutting, bending, drawing, tapping, threading, and the like. And moreover, as pointed to above, the metal lends itself to an ease of welding with the full assurance of a sound, strong weld, having good resistance to intercrystalline corrosion. Moreover, the steel is resistant to cracking under conditions of stress in the presence of chloride and other corrosive atmospheres.

The particularly critical character of the steel of my invention in matters of chemical composition rather clearly appears from the comparison of mechanical properties, general corrosion properties and stress-corrosion properties given below, this for a series of steels according to my invention and a number of steels of composition departing from the steel of my invention in one or more of the essential ingredients. The chemical composition of the various steels and their stress-corrosion characteristics are set out below in Table I. The mechanical properties of the steels according to my invention, as compared with others, are set out in Table II. And, finally, the comparative resistance to general corrosion and to intercrystalline attack is set out in Table III.

TABLE I.—CHEMICAL COMPOSITION OF 26 CHROMIUM-NICKEL-CARBON STAINLESS STEELS AND THEIR STRESS-CORROSION PROPERTIES

| Heat No. | C | Mn | Si | Cr | Ni | Other | Life in hours |
|---|---|---|---|---|---|---|---|
| 18% Chromium Group | | | | | | | |
| R-1735 | .039 | .33 | .33 | 17.70 | 8.11 | | .43 |
| R-1740 | .050 | .39 | .41 | 17.91 | 12.18 | | 2.1 |
| R-1737 | .041 | .39 | .34 | 17.57 | 16.04 | | 4.5 |
| R-1738 | .041 | .45 | .38 | 17.50 | 20.07 | | 10.0 |
| R-1739 | .038 | .55 | .42 | 17.63 | 30.13 | | 34.0 |
| R-6394 | .21 | .51 | .55 | 18.07 | 9.40 | | ¹ 4.0 |
| R-5911 | .57 | .59 | .43 | 18.07 | 9.16 | | 20 |
| R-6395 ² | .70 | .56 | .62 | 18.13 | 9.30 | | 760–1,000+ |
| R-5912 ² | .85 | .67 | .61 | 18.13 | 9.13 | | 1,000+ |
| R-2344 ² | .30 | .51 | .59 | 17.85 | 12.01 | | 1,000+ |
| 23% Chromium Group | | | | | | | |
| R-5913 | .38 | .52 | .47 | 22.23 | 9.04 | | 3.6 |
| R-5914 | .52 | .55 | .45 | 23.38 | 9.02 | | 3.0 |
| R-5915 ² | .72 | .57 | .43 | 23.27 | 9.05 | | 700–1,000 |
| R-6402 | .11 | .58 | .58 | 22.96 | 15.44 | | ¹ 33 |
| R-5663 | .26 | .76 | .47 | 24.01 | 10.31 | | 3.5 |
| R-5664 ² | .28 | .85 | .56 | 23.71 | 15.20 | | 1,000+ |
| R-5916 ² | .37 | .52 | .52 | 23.49 | 15.26 | | ³ 750 |
| R-5784 ² | .37 | .89 | .54 | 22.33 | 16.17 | | 1,000+ |
| R -5917 ² | .55 | .47 | .45 | 23.94 | 14.50 | | 1,000+ |
| R-5918 | .76 | .54 | .49 | 23.72 | 15.92 | | 1,000+ |
| R-5019 | .11 | .52 | .55 | 23.55 | 20.27 | | 1,000+ |
| R-5920 ² | .42 | .50 | .41 | 23.23 | 20.35 | | 1,000+ |
| R-5921 ² | .58 | .52 | .40 | 23.61 | 20.20 | | 1,000+ |
| Others | | | | | | | |
| R-5785 | .40 | .85 | .51 | 26.15 | 15.42 | | 54–500 |
| R-5786 | .38 | .82 | .60 | 22.93 | 15.18 | 1.04 V | 58 |
| R-5787 | .27 | 1.02 | .62 | 22.84 | 15.50 | 1.08 V | 22–75 |

¹ Average.
² Steels according to the invention.
³ Pits.

NOTE.—Phosphorus and sulfur low, i.e., about .013% max. phosphorus and about .011% max. sulfur.

The steels of Table I in the form of notched tensile samples were annealed at 2000° F. and water-quenched. These samples then were loaded at 60,000 p.s.i. for the notched sections and immersed half-way in boiling magnesium chloride solution (42% aqueous solution at a temperature of about 309° F.) for the times indicated and with the results given below.

The mechanical properties of representative steels of Table I are set out below in Table II:

TABLE II.—MECHANICAL PROPERTIES OF REPRESENTATIVE STEELS OF TABLE I

| | Ultimate Tensile strength, p.s.i. | 0.2% yield strength, p.s.i. | Percent Elongation, 4×D | Percent R.A. | Charpy V-notch, ft. lbs. | Hardness |
|---|---|---|---|---|---|---|
| Heat No.: | | | | | | |
| R-5911 | 125,500 | 57,000 | 38 | 45 | | RB97-98 |
| R-5912 [1] | 129,250 | 58,500 | 31 | 32 | | RC23/24 |
| R-5913 | 114,500 | 53,700 | 40 | 54 | | RB95/96 |
| R-5914 | 116,200 | 56,000 | 35 | 40 | | RB97/98 |
| R-5915 [1] | 126,500 | 61,600 | 28 | 29.6 | | RC23/24 |
| R-5664 [1] | 101,900 | 45,100 | 43.0 | 62.0 | | |
| R-5916 [1] | 106,500 | 49,500 | 37 | 50.0 | | RB92/93 |
| R-5784 [1] | 101,500 | 52,000 | 33 | 49 | 54 | |
| R-5917 [1] | 113,000 | 54,700 | 30 | 40 | | RB98 |
| R-5918 | 118,950 | 60,750 | 23 | 28 | | RC25 |
| R-5919 | 90,500 | 40,250 | 46.5 | 66.3 | | RB85/86 |
| R-5920 [1] | 107,000 | 51,700 | 33.0 | 47.5 | | RB94/95 |
| R-5821 [1] | 113,500 | 55,000 | 27.0 | 37.5 | | RB98 |
| R-5785 | 102,700 | 50,000 | 34.5 | 48 | 52 | |
| R-5786 | 104,000 | 45,800 | 36 | 50 | 35/46 | |

[1] Steels according to the invention.

NOTE.—Heats R-5784, R-5785 and R-5786 heated at 1,900° for five minutes and water-quenched; all other heated at 2,000° for five minutes and water-quenched.

The resistance of representative steels of Tables I and II to intercrystalline corrosion as measured by resistance to boiling nitric acid in both the annealed condition and in the annealed and sensitized condition, that is, sensitized by heating at 1250° F. for one hour, is given below in Table III. Specimens of representative steels were subjected to a series of successive treatments in a 65% solution of boiling nitric acid, each for a 48-hour period. Some steels, as noted below, showed an unduly high weight-loss after two treatments while others required the full complement of five as employed under ASTM test procedure for proper evaluation. The rate of the attack by the boiling nitric acid is measured in terms of inches per month.

TABLE III.—REPRESENTATIVE STEELS OF TABLE I UNDER ATTACK OF BOILING NITRIC ACID

| | Annealed— attack, inches per month | Annealed and sensitized— attack, inches per month |
|---|---|---|
| Heat No.: | | |
| R-5911 | .052/.026 (2) | |
| R-5912 [1] | .045/.035 (2) | |
| R-5913 | .0021/.0014 (5) | |
| R-5914 | 0.081/.0051 (2) | |
| R-5915 [1] | .020/.011 (2) | |
| R-5663 | .0009 (5) | .04 (2) |
| R-5664 [1] | .0022 (5) | .066 (2) |
| R-5916 [1] | .0020/.0036 (5) | |
| R-5917 [1] | .0009/.0009 (5) | .0032/.0036 |
| R-5918 | | .019/.032 (2) |
| R-5919 | | .0003/.0005 (5) |
| R-5920 [1] | .0006 (5) | .0024/.0047 (2) |
| R-5921 [1] | | .0992/.0095 (2) |
| R-5786 | .0009 (5) | .0112 (5) |

[1] Steels according to the invention.

From the information presented in Table I above it readily appears that the steels of substantial nickel content, even as much as 30%, with low carbon content and high chromium content, possess very little resistance to stress-corrosion cracking. For example, the Heats R-1735, R-1740 and R-1737, with carbon contents of about .05%, chromium contents of about 18% and nickel contents ranging from about 8% to 16%, fracture within several hours when subjected to a stress of 60,000 p.s.i. in boiling magnesium chloride. And the Heat R-1738, with a nickel content of about 20%, fails in 10 hours, while the Heat R-1739, with a nickel content of about 30%, fails in 34 hours.

A steel with a carbon content of about .50%, a chromium content of about 18%, and a nickel content of about 9% (Heat R-5911) fails in 20 hours. And steels of even higher chromium contents (Heats R-5913 and R-5914), with carbon contents of .38% and .52% respectively, with chromium contents of about 23%, and nickel contents of about 9%, fail within some 3 or 4 hours. And even with a chromium content of about 27% and a nickel content of about 15%, and a carbon content of some .40% (Heat R-5785) the steel is lacking in life under stress in the corrosive atmosphere.

Where the further ingredient vanadium is present (Heats R-5786 and R-5787), with carbon contents of about .20% to about .40%, chromium content of about 23%, nickel content of about 15%, and vanadium content of about 1%, the steels fail in some 20 to 75 hours.

While others of the steels, for example, Heat R-5919, with a carbon content of about .10%, a chromium content of about 23% and a nickel content of about 20%, are possessed of excellent resistance to stress-corrosion cracking, that is, cracking under stress in the presence of a corrosive atmosphere, these steels are deficient in strength. Thus, while the steel of Heat R-5919 sustained a life of over 1,000 hours (being removed from test after 1,000 hours) under a load of 60,000 p.s.i. while partially immersed in boiling magnesium chloride, it is possessed of a tensile strength of only 90,500 p.s.i. with a yield strength of only 40,250 p.s.i. And although it is virtually insensitive to boiling nitric acid, even in the annealed and sensitized condition, as seen from Table III, its deficient strength, especially the yield strength, makes its unsuited to applications where there are required the properties of strength, durability, resistance to wear and good resistance to corrosion under stress.

Although still others of the steels (Heat R-5918) are strong and resistant to stress-corrosion cracking, they are susceptible to intercrystalline corrosion. The Heat R-5918, for example, while of good tensile strength, with a yield strength of some 60,750 p.s.i. and a life exceeding 1,000 hours under a stress of 60,000 p.s.i. in boiling magnesium chloride atmosphere, is readily attacked by boiling nitric acid in the sensitized condition, that is, in a condition following welding operation. This I attribute to a carbon content in excess of the critical value employed in my steel. This steel, however, is eminently suited to applications requiring a combination of strength, ductility and good resistance to corrosion under stress but where there is no encounter with nitric acid or the like.

Contrasting with the steels discussed above, reference is made to the illustrative steels enjoying a combination of resistance to stress-corrosion, good mechanical properties, and resistance to intergranular attack as well. Notably, attention is drawn to the steels containing about 23% chromium employing a combination of high carbon content (about .5% and more) and a substantial nickel content (about 9% to 15%), namely R-5915 and R-5917, or employing a combination of somewhat lower carbon content (about .3% and more) and a high nickel content (about 15% and more), notably the Heats R-5664, R-5916, R-5784, R-5920 and R-5921. These steels are characterized by good resistance to stress-corrosion (see Table I), with a life under test approaching 1,000 hours and more. And of the representative steels of the 23% chromium group the mechanical properties of which were taken (R–5915, R–5664, R–5916, R–5784, R–5917, R–5940 and R–5921) there is revealed a combination of strength and ductility (see Table II). Additionally, these representative steels are resistant to intergranular attack (see Table III). In short, in these steels there is had a combination of properties which is new and surprising.

And of the steels containing about 18% chromium with a combination of a substantial nickel content (about 9%) and a high carbon content (about .70% and more) (R–6395 and R–5912) a similar combination of properties is had. This is perhaps best illustrated by the representative steel R–5912 (about 18% chromium, 9% nickel, with carbon about .85%). That steel is characterized by a combination of excellent stress-corrosion properties and good mechanical properties, although its resistance to intergranular attack leaves something to be desired. The 18% chromium steel with a higher nickel content but lower carbon content, R–2344 (about 18% chromium, with about 12% nickel and a carbon content of about .30%) is also possessed of good stress-corrosion properties with good mechanical properties and, because of the comparatively low carbon content in combination with the chromium and high nickel content, good resistance to intergranular corrosion as well.

CONCLUSION

It is only in the austenitic chromium-nickel stainless steel of high carbon content according to my invention in which the various objects hereinbefore set forth and the many advantages thereof are successfully achieved. My steel employs a minimum of the expensive ingredient nickel and yet assures a combination of strength, resistance to stress-corrosion cracking, and resistance to intercrystalline attack as well. Moreover, the general corrosion-resistance of the steel is high.

My steel is readily melted by conventional methods. It works well in the hot-mill and in the cold-mill. It may be machined, shaped and formed by usual methods of bending, cutting, drawing, threading, tapping, and the like, as in the production of various articles of use. Moreover, it readily lends itself to welding by known and commonly used techniques, as in the fabrication of a wide variety of articles, products and equipment.

Inasmuch as many embodiments of my invention may occur to those skilled in the art to which the invention relates, and inasmuch as numerous variations of the several embodiments herein disclosed may be made, it will be understood that all matter described herein is to be taken to be illustrative and not by way of limitation.

I claim as my invention:

1. Fully austenitic chromium-nickel stainless steel possessing a combination of strength, ductility, weldability, and resistance to stress-corrosion cracking, said alloy essentially consisting of about 18% to about 25% chromium; about 9% to about 20% nickel; about .25% to about .85% carbon, with carbon being inversely proportioned to nickel and for about 18% chromium being respectively about .60–.85%, about .30–.80% and about .25–.50% for nickel contents of about 9%, about 12% and about 20%, and for about 23% chromium being respectively about .50–.75%, about .30–.65% and about .25–.60% for nickel contents of about 12%, about 15% and about 20%; manganese not exceeding 1%; 0% to about 4% molybdenum; and remainder substantially iron.

2. Fully austenitic chromium-nickel stainless steel essentially consisting of about 18% to about 25% chromium; about 9% to about 20% nickel; about .25% to about .65% carbon, manganese not exceeding 2%, and remainder substantially iron, with the relation between the chromium, the nickel, and the carbon contents substantially as follows:

| Chromium | Nickel | Carbon |
| --- | --- | --- |
| about 18% | about 12% | about .30%–.80% |
| about 18% | about 20% | about .25%–.50% |
| about 23% | about 12% | about .50%–.75% |
| about 23% | about 15% | about .30%–.65% |
| about 23% | about 20% | about .25%–.60% |

3. Fully austenitic chromium-nickel stainless steel essentially consisting of about 21% to about 25% chromium, about 10% to about 16% nickel, about .30% to about .50% carbon, manganese not exceeding 2%, and remainder substantially iron.

4. Fully austenitic alloy steel essentially consisting of about 22% to 24% chromium, about 14% to about 16% nickel, about .30% to about .40% carbon, manganese not exceeding 2%, with remainder substantially iron.

5. Fully austenitic alloy steel essentially consisting of about 23% chromium, about 15% nickel, about .30% to about .50% carbon, manganese not exceeding 2%, and remainder substantially iron.

6. Fully austenitic alloy steel essentially consisting of about 18% chromium, about 12% nickel, about .30% to about .50% carbon, manganese not exceeding 2%, and remainder substantially iron.

7. Fully austenitic alloy steel essentially consisting of about 21% to about 25% chromium, about 14% to about 16% nickel, about .30% to about .50% carbon, manganese not exceeding 2%, and remainder substantially iron.

8. Fully austenitic alloy steel essentially consisting of about 21% to about 23% chromium, about 10% to about 16% nickel, about .30% to about .60% carbon, manganese not exceeding 1%, and remainder substantially iron.

9. Fully austenitic alloy steel essentially consisting of about 22% to about 24% chromium, about 14% to about 16% nickel, about .30% to about .50% carbon, manganese not exceeding 1%, and remainder substantially iron.

References Cited

UNITED STATES PATENTS

| | | | |
| --- | --- | --- | --- |
| 2,436,867 | 3/1948 | Lee | 75—128 |
| 2,481,386 | 9/1949 | Bloom | 75—128 |
| 3,152,934 | 10/1964 | Lula | 75—128.9 |
| 3,235,417 | 2/1966 | Roy | 75—128.9 |
| 3,259,528 | 7/1966 | Carlsen | 75—128.9 |

HYLAND BIZOT, Primary Examiner